United States Patent [19]

Rutkiewicz

[11] Patent Number: 5,345,223
[45] Date of Patent: Sep. 6, 1994

[54] SNOW SENSOR

[75] Inventor: Robert D. Rutkiewicz, Minneapolis, Minn.

[73] Assignee: The B. F. Goodrich Company, Akron, Ohio

[21] Appl. No.: 940,482

[22] Filed: Sep. 4, 1992

[51] Int. Cl.$^5$ ............................................. G08B 19/02
[52] U.S. Cl. ................ 340/581; 340/309.15; 340/588
[58] Field of Search .......... 340/581, 601–602, 340/604, 962, 588, 309.15, 596; 73/170 R, 170.26; 219/497; 244/134 F

[56] References Cited

U.S. PATENT DOCUMENTS

| | | | |
|---|---|---|---|
| 2,432,669 | 12/1947 | Kliever | 340/962 X |
| 2,656,525 | 10/1953 | Kinsella | 340/581 |
| 3,571,709 | 3/1971 | Gaertner | 340/581 X |
| 3,594,775 | 7/1971 | Fox | 340/581 X |
| 4,333,004 | 6/1982 | Forgue et al. | 219/497 |
| 4,755,062 | 7/1988 | Meyer | 374/16 |
| 4,980,673 | 12/1990 | Kleven | 340/581 |
| 4,981,369 | 1/1991 | Kumada et al. | 374/28 |
| 5,003,295 | 3/1991 | Kleven | 340/581 |
| 5,140,135 | 8/1992 | Freeman | 219/497 |

FOREIGN PATENT DOCUMENTS 2104302  8/1972  Fed. Rep. of Germany ...... 340/581

Primary Examiner—Thomas Mullen
Attorney, Agent, or Firm—Westman, Champlin & Kelly

[57] ABSTRACT

The present invention utilizes a single temperature sensor and heating element in thermal contact with the sensing surface. The signal from the temperature sensor and the signal from the heating element are input to a standard microprocessor integrated circuit. The microprocessor continuously compares the two signals to accurately assess whether snow is present on the sensing surface. The present invention eliminates the requirement for a moving airmass to accurately assess the presence of snow on the sensing surface. The present invention does not ingest snow nor require ice formation to operate. The snow sensing surface and the sensor housing are weather and debris resistant. The present invention may be mounted in an elevated position or in any suitable location proximate an area to be monitored. The present invention serves as an integral part of a closed loop control system for numerous snow removal applications.

7 Claims, 13 Drawing Sheets

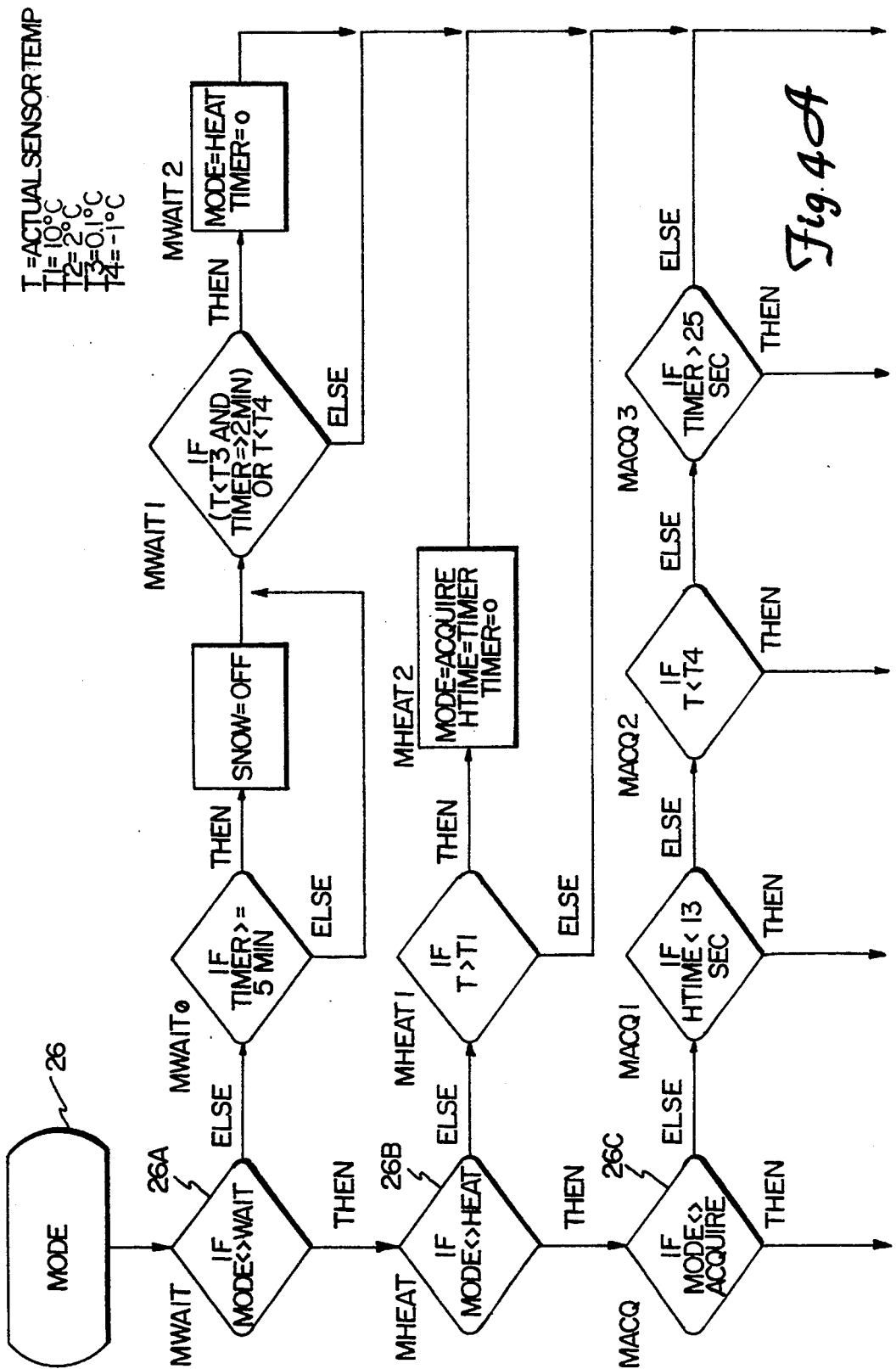

SNOW SENSOR

BACKGROUND OF THE INVENTION

The present invention is directed to a microprocessor-based sensor for detecting the presence of snow upon a sensing surface and providing an output as to snow presence.

Preventative safety and automatic snow removal systems require an immediate indication when snow is beginning to accumulate on a monitored surface. To efficiently implement such systems a reliable snow sensor is required so that system elements are not unnecessarily operated. Some applications for the snow sensor of the present invention is used where snow detection triggers automatic snow removal from surfaces such as railways, roadways, bridges, pedestrian walkways and the like.

Further applications of the snow sensor include situations where manual intervention is required. A reliable snow sensor must provide an indication of the presence of snow so that necessary and adequate weather precautions will be prepared in advance of significant snow accumulation. A suitable alarm or warning coupled to the snow sensor signal will be effective to alert persons to take action in this situation.

Prior art snow sensors use a variety of methods for sensing the presence of snow. Some prior art approaches to sensing snow utilize optical, microwave or electromagnetic means. Other prior art sensors employ vibration analysis and still others use electrical measurements of resistivity or capacitance, which vary with the presence of ice and snow. Many of the prior art snow sensors rely on snow or ice accumulation to occur before a positive snow signal is emitted.

Prior art snow and ice sensor systems abound in the aerospace industry. However, the majority of aerospace snow sensors rely on a moving airmass to generate ice formation. Others sample a moving airmass for liquid water content, temperature and humidity. In some aerospace snow sensors heating means are used to cause accumulated snow or ice to be shed from the sensor to provide dynamic snow and ice sensing capability.

A need continues to exist for a simple, reliable and accurate snow sensor for detecting minute amounts of snow accumulation without relying on a moving airmass or coordinated weather measurements.

SUMMARY OF THE INVENTION

The snow sensor of the instant invention provides a simple and effective method of continuously monitoring an area for the presence or absence of snow. The snow sensor of the snow sensor provides a positive signal when a slight amount of snow is present on a snow sensing surface. The snow sensor provides an output that will trigger appropriate remote devices or provide a warning signal so that snow accretion may be properly addressed.

The snow sensor of the instant invention contained in a weather-sealed housing and utilizes a single heating element and a single temperature sensor thermally coupled to a single sensing surface. The heating element is energized at regular intervals to cycle the sensing surface temperature. The temperature sensor monitors the heat input and rate of decline of the temperature of the sensing surface for each heating cycle. By analyzing the time-temperature relationship of the sensing surface following heater energization a reliable indication of the presence of snow is effected. The snow sensor operates on a minimal electrical input and when coupled to high-energy snow removal (melting) systems creates an efficient mode of operation of the same by ensuring that such systems are operated selectively only when snow precipitation is actually occurring.

The present snow sensor is passive in operation (i.e., it does not ingest snow) and is housed in a sealed container that does not require significant maintenance or physical monitoring. The snow sensing surface and the snow sensor housing are manually affected by weather conditions and debris.

The snow sensing surface is automatically cleared of snow crystals that have accumulated and the sensor thereafter continuously monitors the snow sensing surface to determine when the precipitation of snow has ceased. A weather-sealed electrical connection provides the snow sensor output signal to remote devices such as remote heating equipment and data logging equipment.

The snow sensor of the present invention may be mounted in an elevated position or near the ground proximate an area to be monitored and will provide an electrical signal to devices that are required to operate in the monitored area while snow is accumulating.

The snow sensor can be used in conjunction with human observation or additional weather sensing equipment to provide a manual override to the snow sensor electrical signal. The electrical signal of the present snow sensor can be the primary input to implement automatic activation of such devices. The snow sensor of the present invention will serve best as an integral part of a stationary closed loop control system for many snow-sensitive applications. For example, automatic snow removal is desired on sidewalks, roadways and railways to improve operating safety and reliability.

BRIEF DESCRIPTION OF THE DRAWINGS

FIGS. 4A and 4B are flow charts illustrating the custom logic routine of the MODE module of the present invention;

DETAILED DESCRIPTION OF THE PREFERRED EMBODIMENTS

The snow sensor of the present invention operates by cyclically energizing a heating element thermally coupled to a snow sensing surface, turning the heating element off and then monitoring the temperature of the snow sensing surface for a thermal signature characteristic of the presence of snow.

Figure 1A:
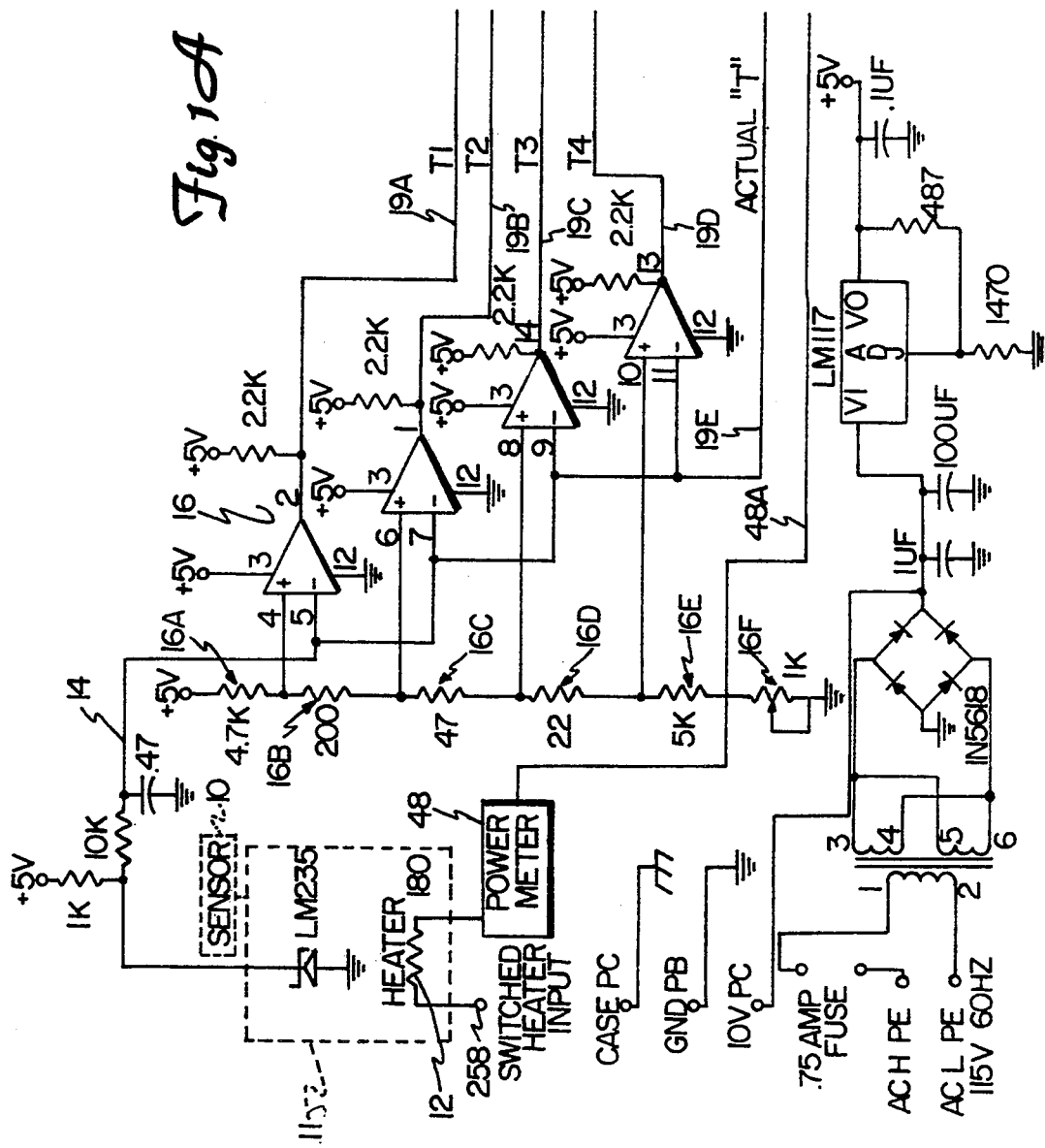
FIGS. 1A and 1B are schematic block diagrams of an electrical circuit for a snow sensor of the present invention.
Figure 1B:
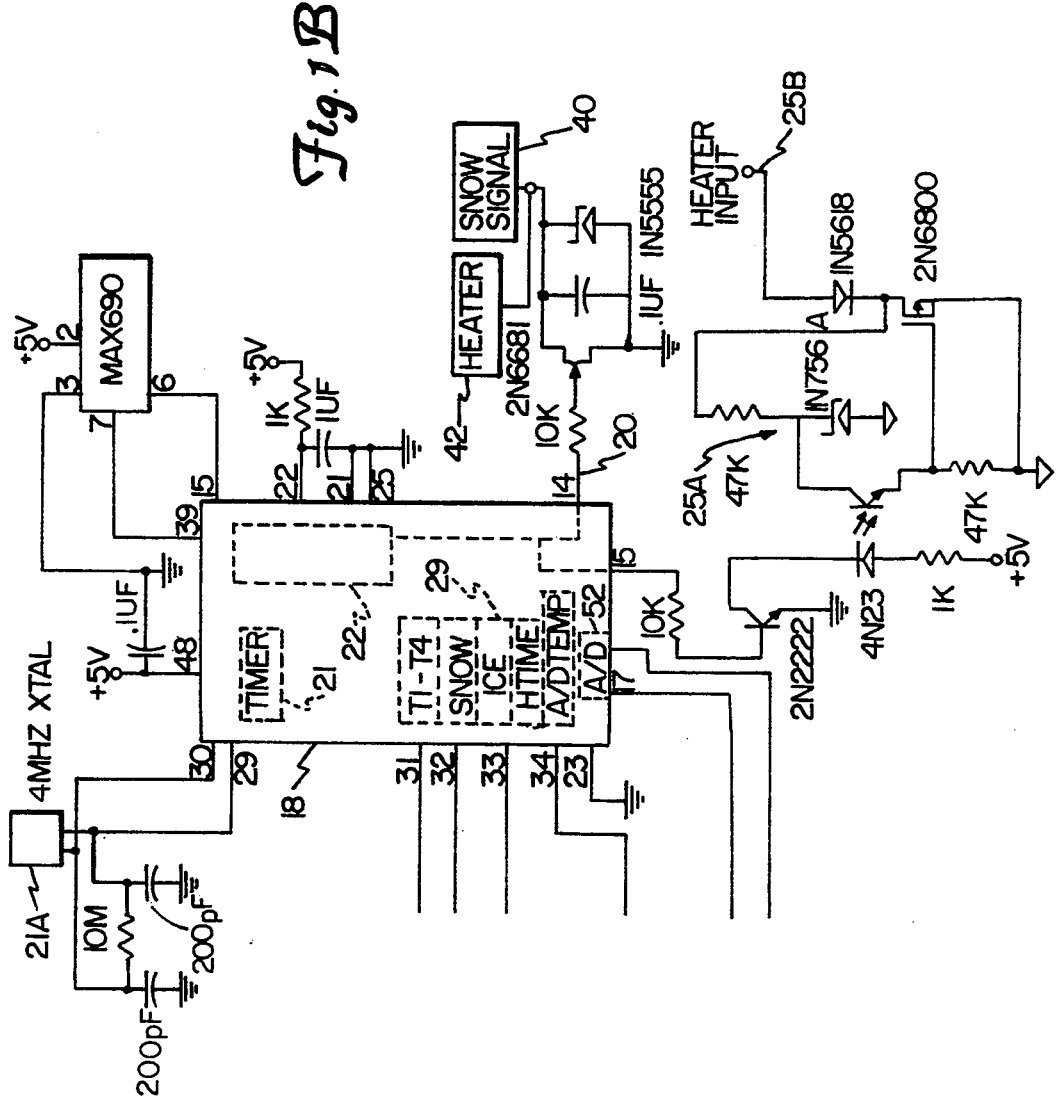
Figure 1C:
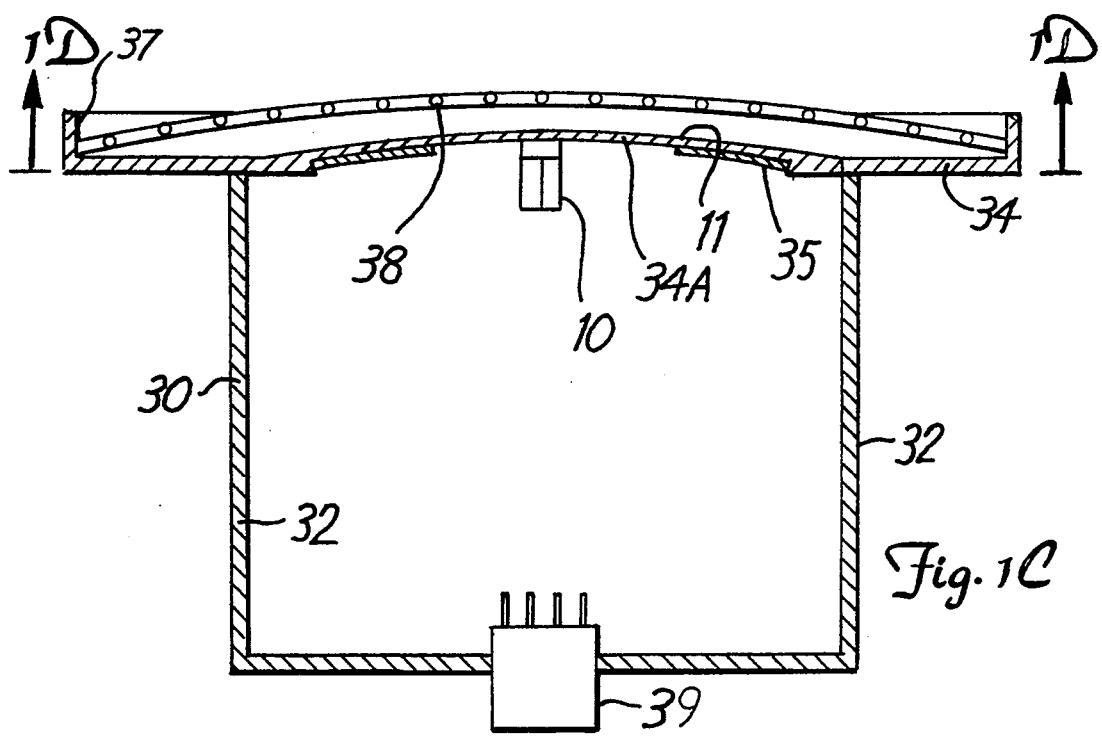
FIG. 1C is a sectional view of a housing for the snow sensor of the present invention.

In FIGS. 1A and 1B, the top level electrical schematic of the present invention, and in FIG. 1C, a sectional view of a housing, a single temperature sensor 10 is in thermal contact with a heating element 12 and a sensing surface, represented in dotted lines at 11. The sensing surface 11 is an exterior surface of a wall of metal or other good heat conducting material. The temperature sensor 10 provides an electrical output indicating the temperature of the sensing surface 11 during each snow sense cycle. The temperature sensor 10 may be of any suitable design, including a resistor connected in a suitable sensing bridge circuit.

The output signal of temperature sensor 10 is carried on sensor output line 14. The output signal on sensor output line 14 is an electrical potential, the magnitude of which is dependent upon the temperature of the sensing surface 11. The output signal is fed to a comparator array of conventional design, indicated generally at 16 operating as an analog to digital (A/D) converter. The comparators of array 16 provide separate signals indicating that the temperature of our sensing surface 11 has obtained selected temperature thresholds, The output signal on line 14 is thus digitized and provided as an input to a microcontroller 18 on inputs 19A, 19B, 19C and 19D, each input representing a different threshold temperature level. Microcontroller 18 implements a logic routine to generate a "snow/no snow" output on line 20. In the embodiment illustrated, the microcontroller 18 comprises a type MC68HC811E2 from Motorola Inc. of Schaumburg, Ill.

The microcontroller 18 receives a clock signal from clock 21A and in turn operates a timer 21, embodied in program code. The timer 21 provides signals to and receives setting signals from a logic module 22 embodied in program code. The routine of the logic is thus controlled by the clock 21A through the timer 21. The actual temperature "T" is provided on line 19E, which is connected to line, and is converted to a digital form in an A/D converter 52 internal of the microcontroller 18 for use by microcontroller 18.

The microcontroller 18 includes local memory 29 for the storing of variables. The variables include T1–T4, SNOW, ICE, which are boolean variables or logic flags. Variables HTIME and A/D TEMP are numerical values to be described below.

Figure 1D:
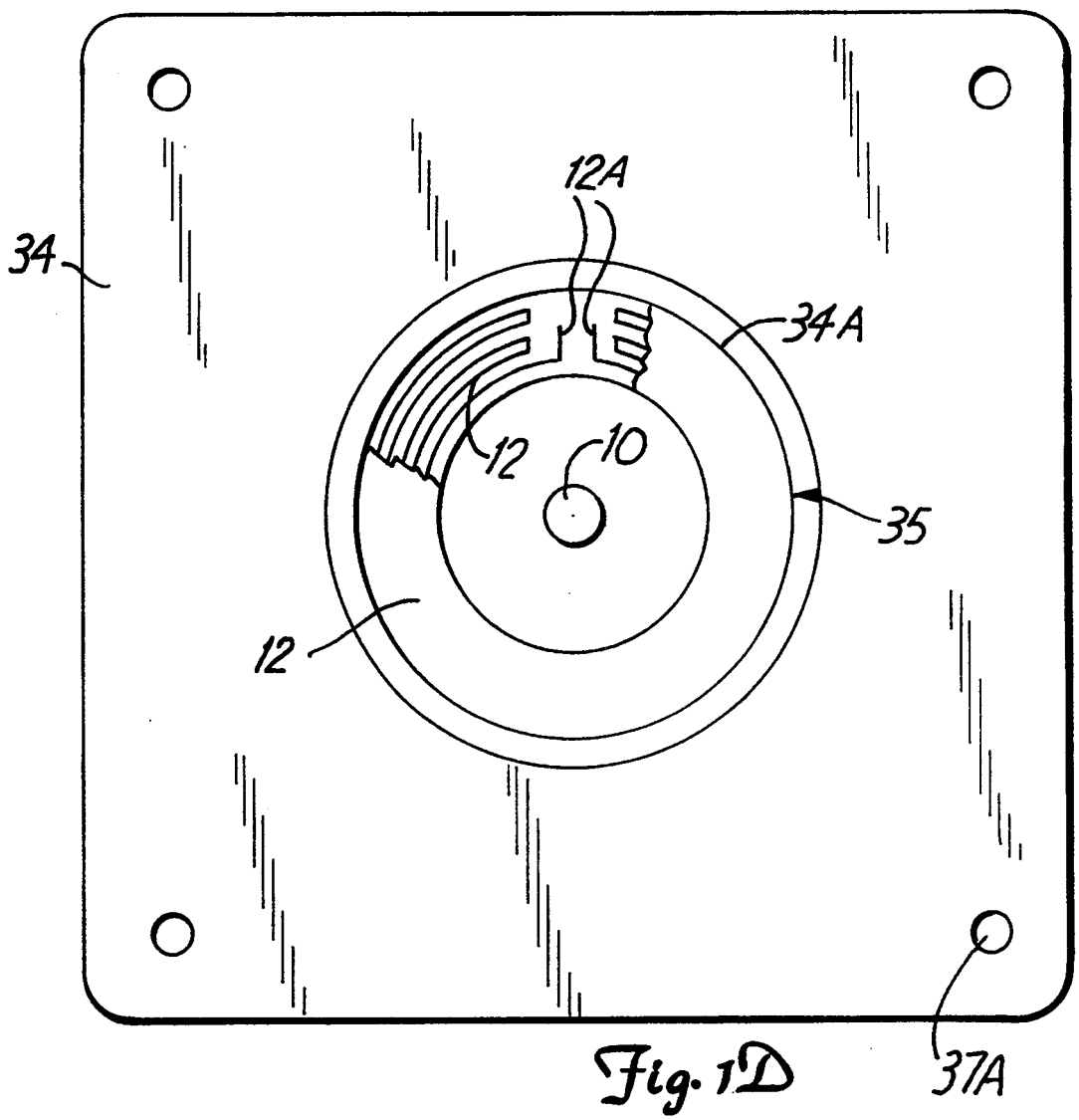
FIG. 1D is a sectional view of the housing taken on line 1D—1D of FIG. 1C.

FIG. 1C illustrates a housing 30 that is hermetically sealed in use. The housing 30 has support walls 32 and a top sensing wall 34 that includes surface 11 which is exposed to receive snow as the snow falls. The surface 11 is slightly convex or crowned and is positioned substantially horizontally. A central wall portion 34A having surface 11 is of reduced thickness relative to the rest of the wall 34 and is formed by a recess 35. Wall 34 is made of metal (aluminum) or other material of high thermal conductivity and low specific heat. Heater 12 and sensor 10 are shown mounted in thermal contact with the wall section 34A and thus with surface 11. The view of FIG. 1D illustrates the annular (ring-like) shape of heating element 12. The heater element is a thin film or foil deposited on a support and in thermal contact with the wall section 34A, on an opposite side of the wall section 34A from surface 11. The heater 12 includes suitable leads 12A for connection to a suitable power source. The temperature sensor 10 can be any desired type which provides a voltage output proportional to sensed temperature. As shown in FIG. 1C, the sensor 10 is a temperature sensing integrated circuit, but it could also be a platinum resistance thermometer connected in a conventional bridge or four wire sensing circuit. An electrical connector 39 is provided for connection of power leads and for connection of a signal lead carrying an output signal indicating snow. The output signal can be used to indicate an alarm 40 or energize a heater 42 (FIG. 1B) used to heat a bridge deck or walkway, for example.

The wall 34 may have a wind deflecting fence or wall 37 bounding the perimeter, if desired. The wall 37 may be partially bounding or fully bounding with drain walls 37A. A screen 38 for leaves or debris also can be used over the wall 34 and sensing surface 11.

Figures 2, 3:
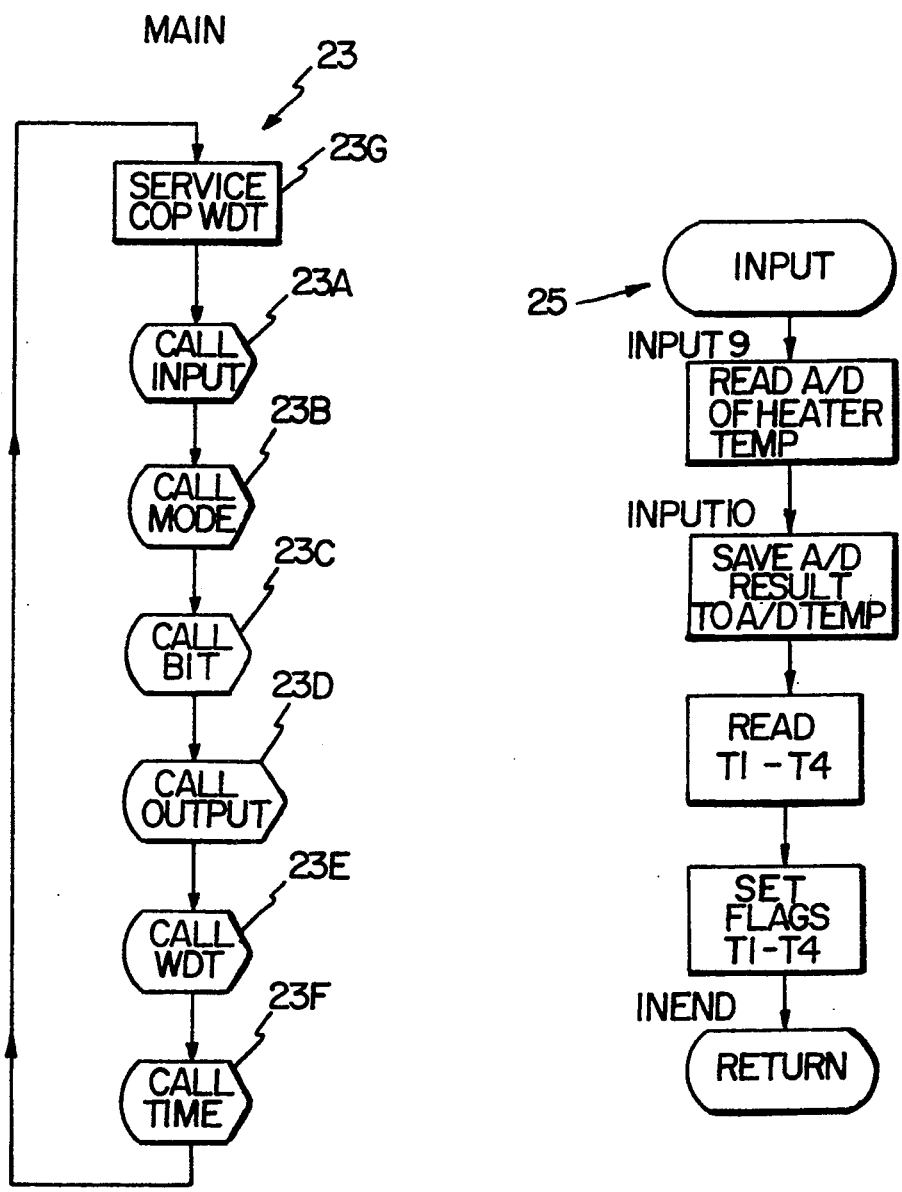
FIG. 2 is a flow chart illustrating the chronological control steps of the main module routine of the present invention.
FIG. 3 is a flow chart of the INPUT logic routine.

Referring to FIG. 2, the MAIN module routine 23 of the logic for microcontroller 18 is shown in block diagram form. The MAIN module 23 makes sequential calls to timers provided by timer 21 to the constituent modules of the logic 22 in microcontroller 18 of the snow sensor, thereby continuously cycling the snow sensor through a routine designed to detect the presence of snow upon the sensing surface 11. Each of the constituent logic modules is described in detail in the text following the description of the MAIN module. These modules are the INPUT23A, MODE 23B, BIT (Built In Test) 23C, OUTPUT 23D, WATCH DOG timer 23E and TIME 23F modules. It should be noted that the modules that are called by the MAIN module are not necessarily required to operate in the sequence described, as the snow sensor of the present configuration will operate with the constituent modules in any order.

At the beginning of each sensing cycle established by the start of timer 21, the MAIN module 23 services the Cop Watch Dog Timer (CWDT) 23G to reset this monitoring device. The CWDT is a feature common to embedded software applications and in operation the CWDT ensures that the snow sensor continues to try to operate if the software is disrupted from normal operation for any reason. In the preferred embodiment, the snow sensor calls two separate watch dogs, a WDT and CWDT in each software cycle, which is a single loop shown in FIG. 2.

The input module 25 shown in FIG. 3 is called as shown by the block 23A. The module saves the result from A/D convertor 52 to A/D TEMP in memory 29. This module further reads the current temperature inputs 19A–19D and sets the logic flags T1–T4 and saves them for use in the MODE Logic Module to be described below. The inputs are monitored at a suitable frequency to ensure that the temperature signals are an adequate representation of the temperature of the sensing surface 11.

Figure 4B:
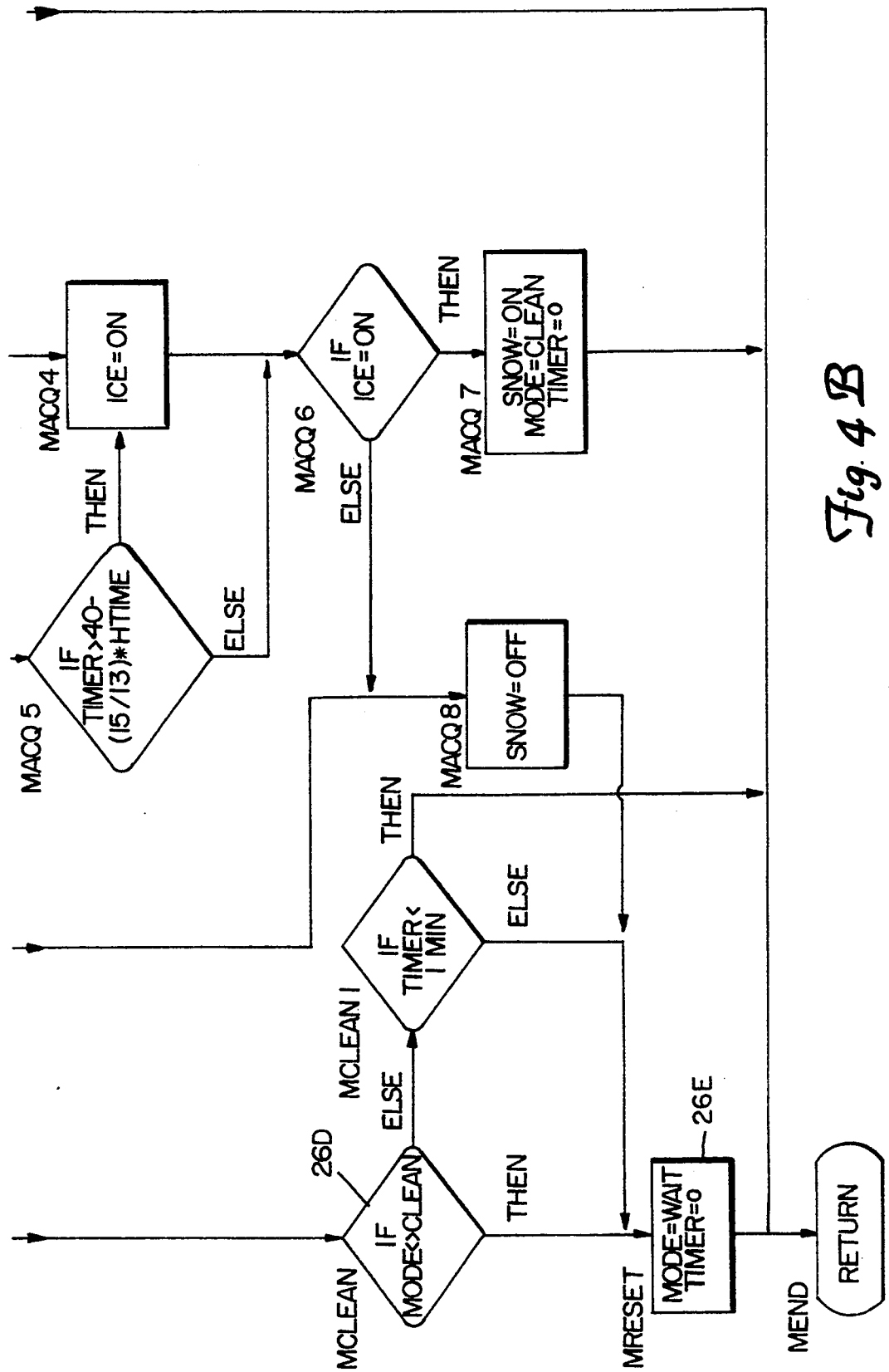

Referring to FIGS. 4A and 4B, a flow chart of the custom logic routine of the MODE module 26 is represented. The four possible operating MODEs, 26A–26D to be described below, of the logic routine are sequentially queried to determine the status of the snow sensor. Each operating mode 26A–26D triggers a distinct logic path through the custom logic routine.

The timer 21 provides a temporal reference to the logic function of microcontroller 18 so that each period of a software cycle is 0.066 seconds. The snow sensing cycle may be in the range of a few seconds to over five minutes in the preferred embodiment.

At selected reference periods the temperature signal (voltage) from temperature sensor 10 is compared with the preset reference voltages at the comparators in comparator array 16 which represent preselected temperature values T1–T4. The preferred values of the preselected temperatures are T1=10° C., T2=2° C., T3=0.1° C. and T4=−1° C. Resistors 16A, 16B, 16C, 16D, 16E and potentiometer 16F are used to calibrate the comparator array 16.

The MODE module 26 of the snow sensor logic has four possible status modes: WAIT 26A, HEAT 26B, ACQUIRE 26C and CLEAN26D. If the snow sensor is not in one of these four states then the MODE module will set MODE equal to WAIT and reset the timer 21 to zero, as shown by control block 26E.

The first status query in the logic routine is whether the snow sensor is in WAIT mode 26A. If the status of the snow sensor is not in WAIT mode, the logic then queries whether the status of the snow sensor is in HEAT mode 26B. If the status of the snow sensor is not in HEAT mode, the logic queries whether the status of the snow sensor is in the ACQUIRE mode 26C. If the status of the snow sensor is not in ACQUIRE mode, the logic then queries whether the status of the snow sensor is in CLEAN mode 26D. If the status of the snow sensor is not any of the above modes the MODE module is reset by control block 26E where the MODE is set to WAIT and TIME is reset to zero by resetting timer 21.

Operation of the snow sensor in each of the four modes are now described.

WAIT mode: In the WAIT mode the timer 21 is first queried whether the timer value (the time elapsed since it was started) is less than five minutes. If the timer value (time elapsed) is greater than or equal to five minutes then the SNOW signal is set to OFF. Further query of sensing surface temperature is made regardless of the time elapsed on timer 21. If the temperature of the sensing surface is lower than T4 (less than −1° C.), or if the temperature is less than T3 (+0.1° C.) and the timer presently has a time elapsed greater than or equal to 2 minutes, MODE is set to HEAT (the surface is near freezing within two minutes of the start of the cycle) and the timer is reset to zero. Otherwise, if the sensing surface temperature is greater than T4 (−1° C.), or greater than T3 (0.1° C.) and the time elapsed on timer 21 is presently less than 2 minutes, the MODE module remains in WAIT (the surface is not at freezing) and the snow sensor logic then begins another software cycle.

HEAT mode 26B: The temperature of the snow sensing surface is first compared with T1 (10° C.). If the temperature is less than T1 (10° C.) the snow sensor returns for another cycle. If the temperature is greater than T1 then MODE is set to ACQUIRE, the heater time value (HTIME) 25 (FIG. 1B) is set to the present timer value and the timer 21 is reset to zero before returning for another software cycle.

ACQUIRE mode 26C: If the value of the HTIME is less than 13 seconds, the snow signal is turned off. If the HTIME value is greater than or equal to 13 seconds, the temperature of the snow sensing surface is compared to T4 (−0.1° C.).

If the snow sensing surface is cooler than T4 (−0.1° C.) and the elapsed time of timer 21 is greater than 25 seconds the internal ICE indicator is turned on. If the ICE signal is "on", the SNOW signal is set to on to give the alarm or turn on heaters, the MODE is set to CLEAN and the timer 21 is reset.

If T (actual measured temperature) is greater than T4 (−1° C.) and the timer is less than 25 seconds the MODE remains in ACQUIRE and the sensor returns for another software cycle. If T is less than T4 (−1° C.) and the TIMER is less than 25 seconds, a calculation is performed to determine if ICE is set to ON.

CLEAN mode: In the CLEAN mode the timer 21 is queried and if the timer elapsed time is less than one minute the sensor returns for another software cycle. If the timer 21 elapsed time is greater than or equal to one minute then MODE is set to WAIT, and the timer 21 is reset to zero. The sensor then returns for another software cycle.

Figure 5A:
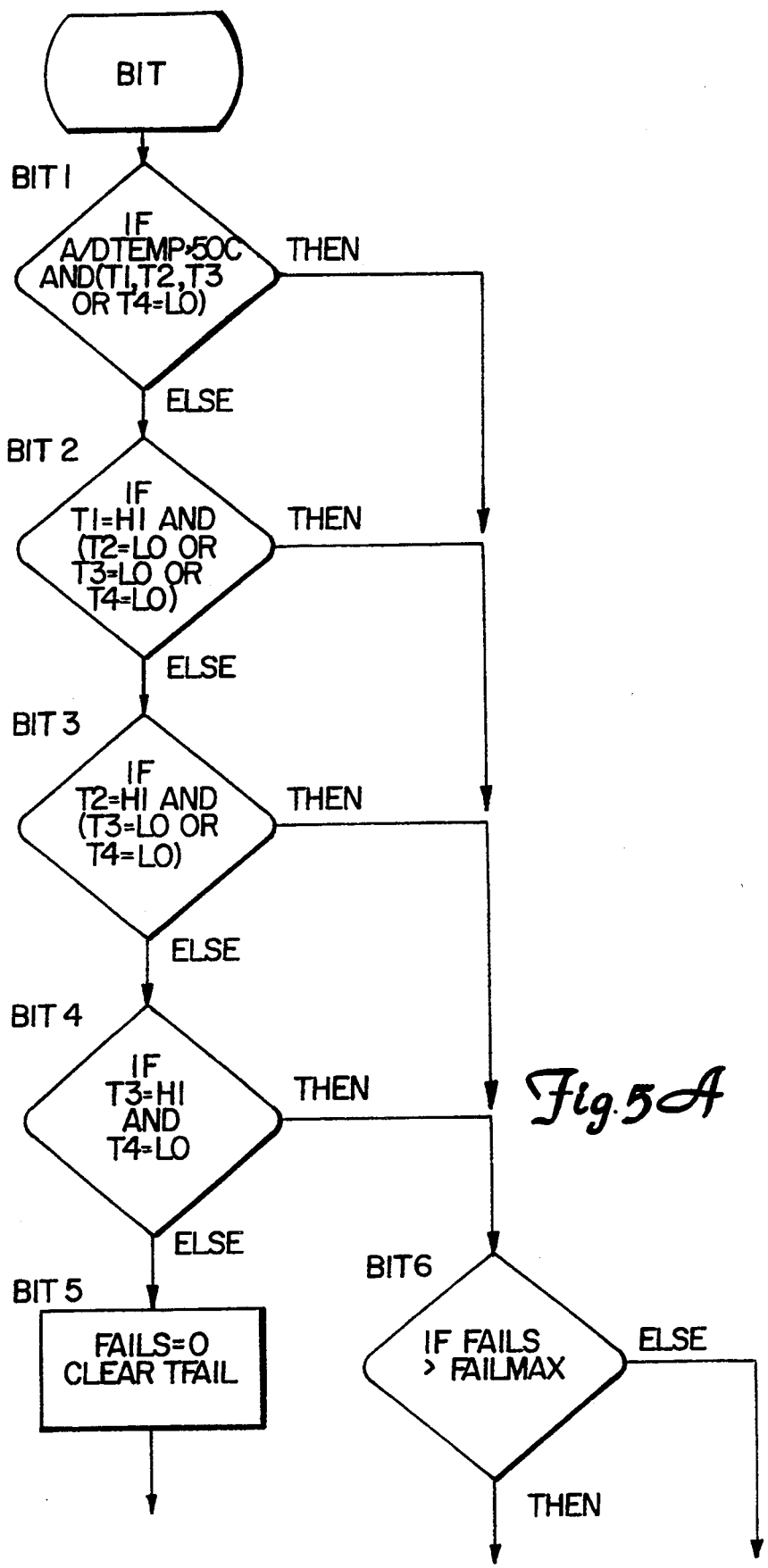
FIGS. 5A and 5B are flow charts of the BIT module.
Figure 5B:
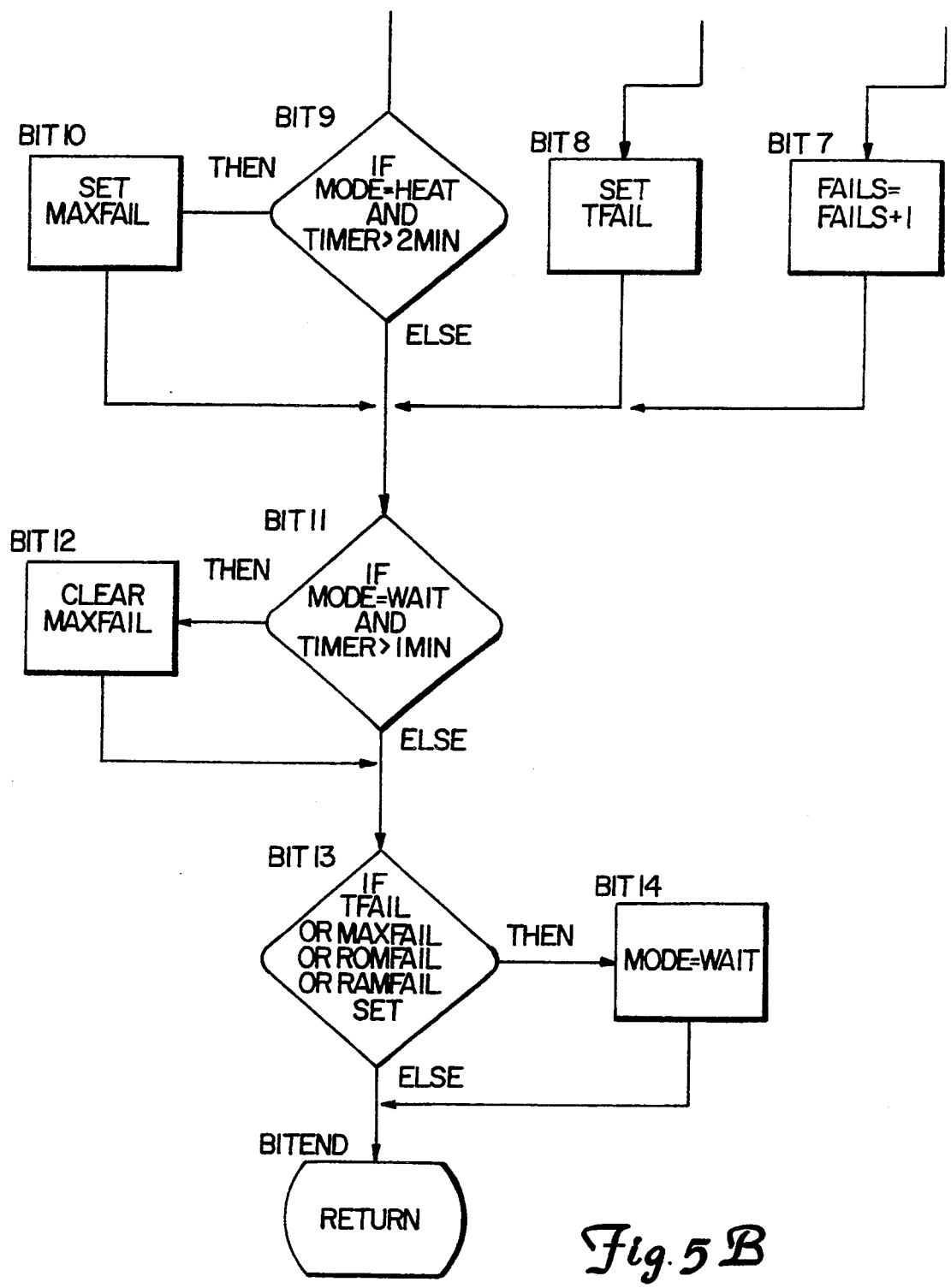
Figure 6:
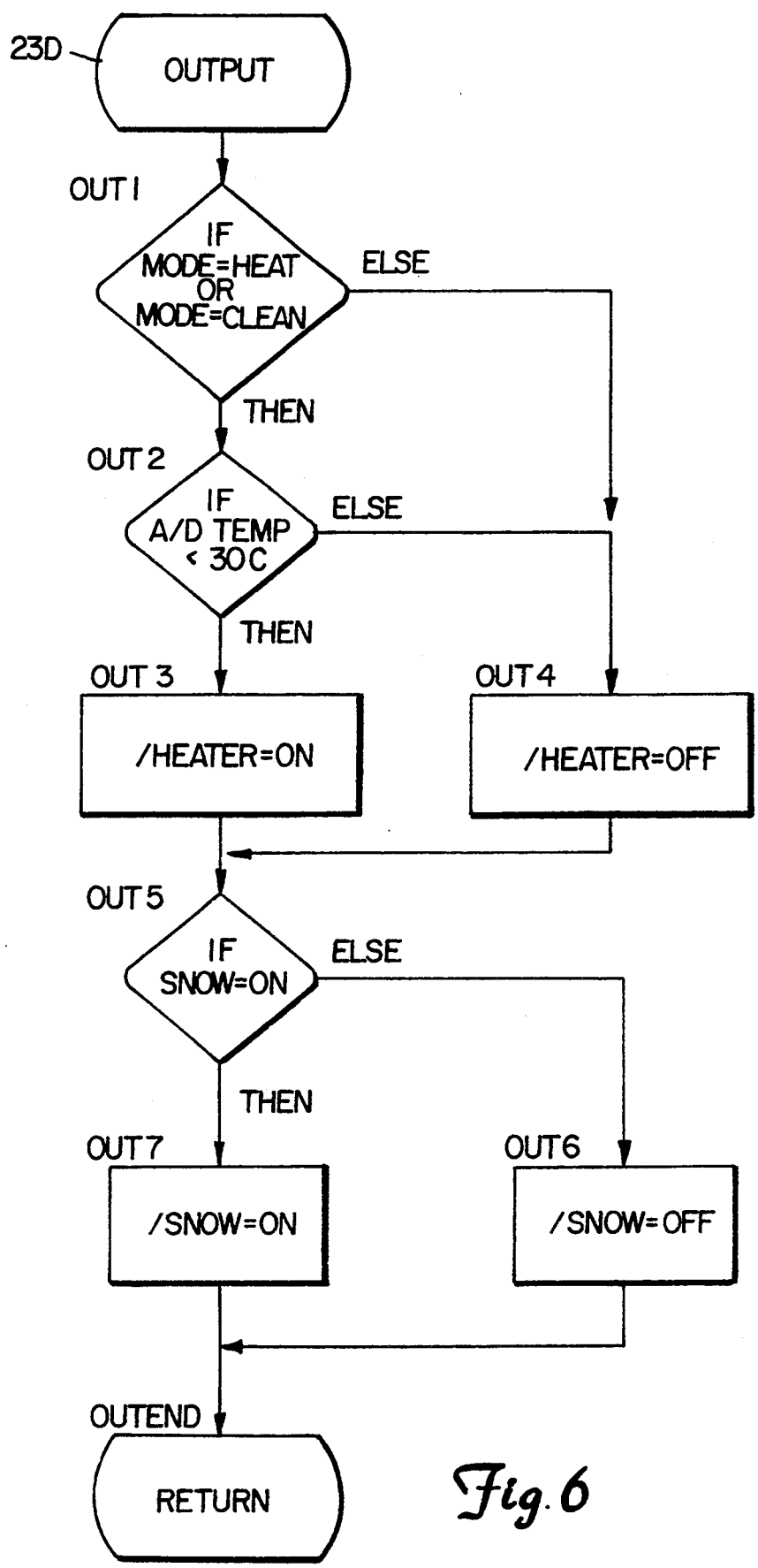
FIG. 6 is a flow chart of the OUTPUT module.
Figure 7:
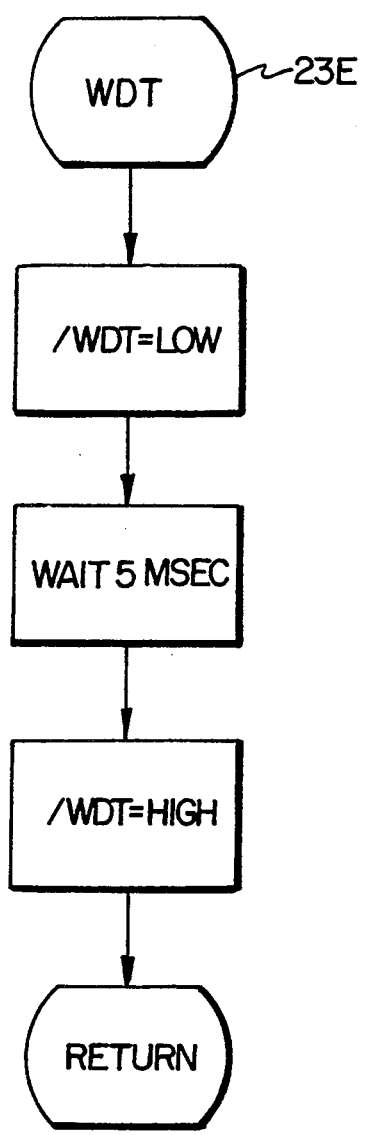
FIG. 7 is a flow chart of the WDT module.
Figure 8:
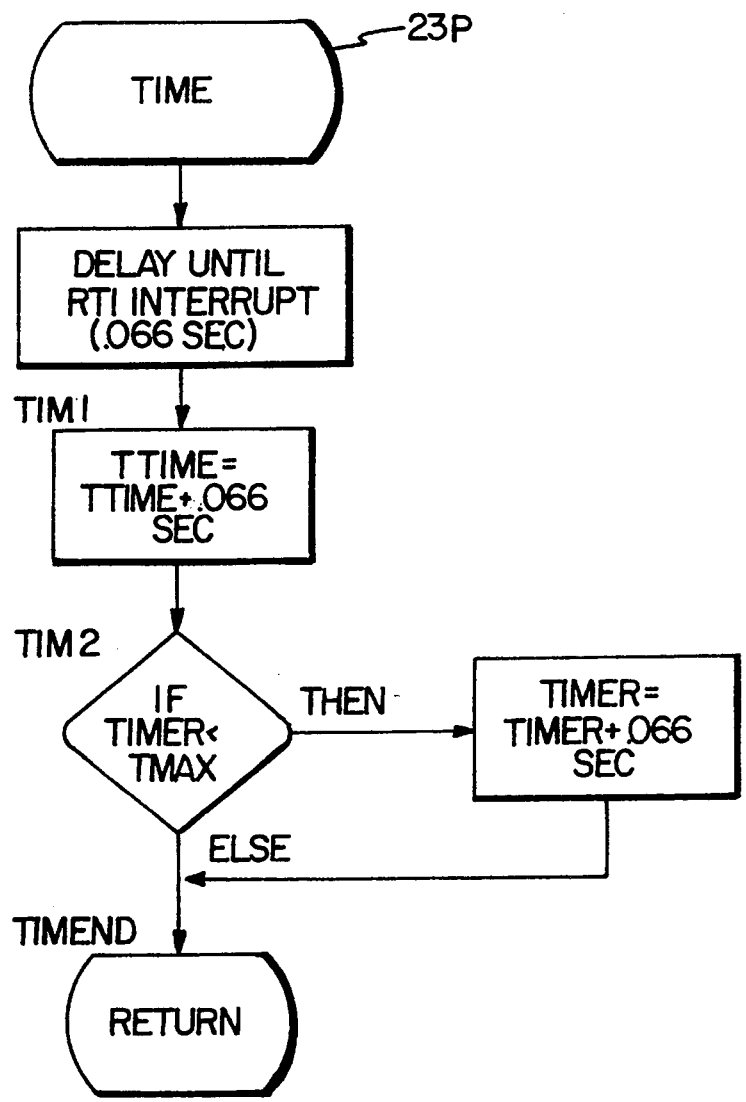
FIG. 8 is a flow chart of the TIME module.

Referring back to FIG. 2, the snow sensor of the present invention includes a fault indicator module 23B titled BIT that will track potentially erroneous sensor readings and provides a counter that allows the sensor to clear the erroneous readings and begin sensing accurately without outside intervention. The flow chart for the BIT module is shown in FIGS. 5A and 5B and as shown various conditions are sampled to determine the appropriate status.

The snow sensor has an OUTPUT module 230 for providing the ON or OFF snow indication. The OUTPUT module first queries the MODE module for sensor status. If MODE is set to HEAT or CLEAN and the sensing surface temperature is less than 30° C. then the heater is set to ON by energizing switch 25A. If MODE is not set to CLEAN or HEAT or the A/D temperature is greater than or equal to 30° C., then the heater is set to OFF. In either case the SNOW status (the snow signal) is queried. If SNOW is set to ON then the snow output/SNOW is set to ON and the ON signal is provided as an output signal from the sensor. However, if SNOW is set to OFF then the snow output/SNOW is set to OFF and the snow signal output from the sensor is terminal.

As shown in FIG. 1, a power meter 48 can be used to monitor power supply input to the heater 12. An output signal from the power meter 48 is provided along signal line 48A to the A/D convertor 52. Digital values representing the power supplied is used to adjust line segments 56 and 57 in FIG. 9 to be described below.

Figure 9:
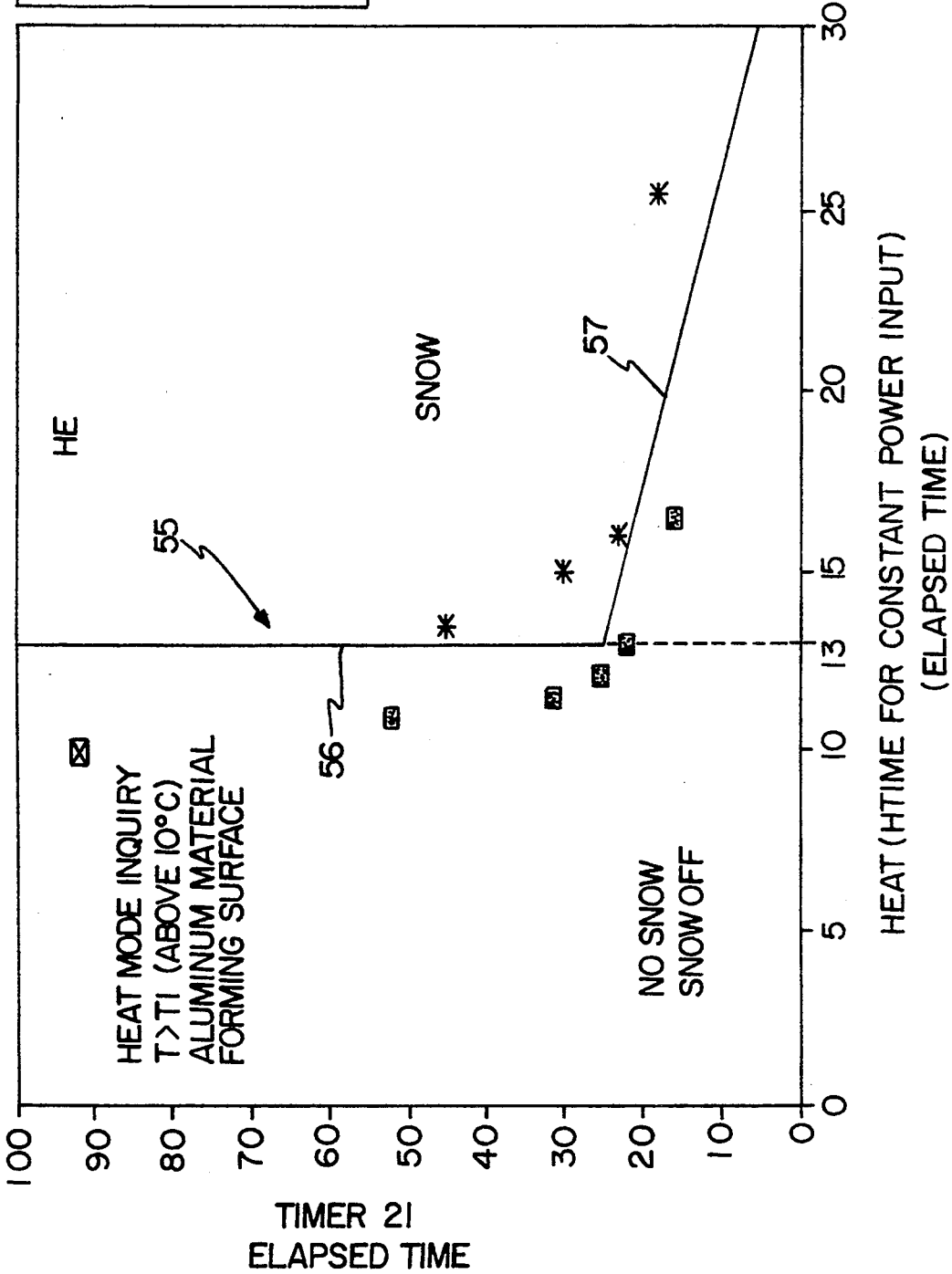
FIG. 9 is a graphical representation of an ACQUIRE mode of a snow sensing cycle.

FIG. 9 is a graphical representation of heater operating time at constant power input in relation to elapsed time of timer 21. The decision line as to whether the SNOW signal is provided is illustrated by the plot shown at 55. This plot has a line segment 56 that extends substantially vertically and shows that if the heater has been "ON" for less than 13 seconds, regardless of the elapsed time of timer 21, the SNOW signal is OFF. No snow is present. It should be understood that the line segment 56 (13 seconds) is dependent on the type of material used for surface 11, as well as the thickness of the wall.

Referring back to FIG. 4A, if during the HEAT mode inquiry, the surface 11 temperature T is above T1 (10° C.) indicating that the surface temperature is in fact above than 10° C., the ACQUIRE mode sequence is initiated. Then, if during the ACQUIRE mode, the elapsed heater ON time is more than 13 seconds and the temperature of surface 11 is less than T4 (−1° C.) or (−1° C. or freezing) and the timer 21 elapsed time is more than 25 seconds, the ICE=ON signal is given. This decision is graphically to the right of line 56 of FIG. 9 and above the line segment 57. If at that inquiry T, the temperature is greater than T4, a further comparison is made. If timer 21 elapsed time is greater than the quantity (40−(15/13)*TIME) with the quantity (15/13) being the slope of the line segment 57 and the quantity HTIME being set during the HEAT mode, then the ICE=ON signal is also turned on. If neither of the decisions shown in the flow path blocks of the ACQUIRE mode in FIG. 4 lie above line 57, and to the right of line 56, the ICE=ON signal is not given and SNOW=OFF. The software sequence can be set to give "no snow" signal at any condition shown in FIG. 9 to the left of line 56 and below line 57.

Although the present invention has been described with reference to preferred embodiments, workers skilled in the art will recognize that changes may be made in form and detail without departing from the spirit and scope of the invention.

What is claimed is:

1. A snow sensor apparatus and circuit for sensing the presence of snow on a snow sensing surface, comprising:

a housing member having a wall whose surface forms the snow sensing surface;

a single heating element coupled to the wall for heating the snow sensing surface;

a single temperature sensor for detecting the temperature of the snow sensing surface and providing a temperature sensor signal;

controller means coupled to the heating element and temperature sensor for repeatedly activating the heating element and monitoring the temperature sensor signal in respective cycles, each as a function of time;

logic means for processing a temperature sensor signal and providing an output signal indicative of the presence of snow on the snow sensing surface, as a function of the cycles controlled by the controller means;

an electrical connector attached to the housing member for conducting the output signal therethrough; and a region on the wall having less thickness with respect to the snow sensing surface than the remainder of the wall and being in thermal contact with the temperature sensor and the heating element, wherein the reduced thickness region is formed by providing a circular recess on the sensing surface, and wherein the heating element comprises a metallic foil heating element disposed within the recess.

2. The snow sensor of claim 1 wherein the snow sensing surface comprises a thermally conducting metal surface.

3. The snow sensor of claim 2 wherein the wall forming the snow sensing surface is made of aluminum.

4. The snow sensor of claim 2 wherein the snow sensing surface is dome shaped.

5. The snow sensor of claim 1 wherein the temperature sensor is located at the center of the circular region of reduced thickness.

6. The snow sensor of claim 1 further comprising means to measure the amount of power provided to the heating element and to provide a signal indicating such amount of power to the logic means.

7. The snow sensor of claim 1 further including means providing logic parameters to the logic means which include means to compare the temperature sensor signal with a present temperature level and to determine the total elapsed time of heating element activation as a basis for determining whether or not the logic means provides the output signal.

* * * * *